No. 692,808. Patented Feb. 4, 1902.
W. N. WEMMER.
SAFETY VALVE.
(Application filed May 16, 1901.)
(No Model.)
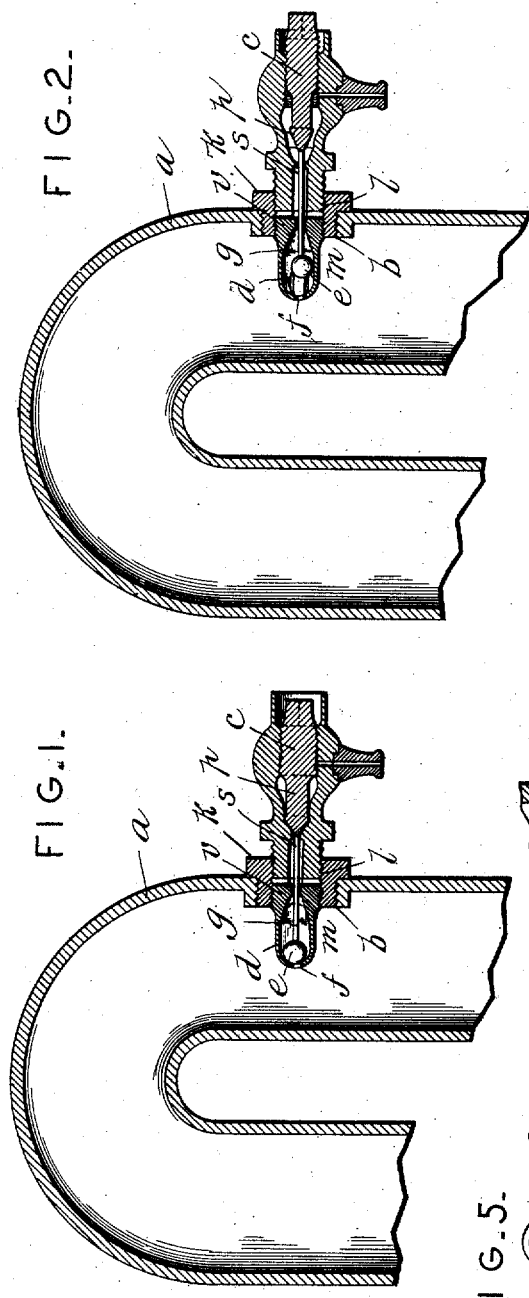
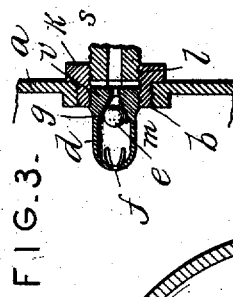
ATTEST—
Harry L. Ames.
George M. Anderson.
INVENTOR—
W. N. Wemmer.
By E. W. Anderson,
his Atty.

UNITED STATES PATENT OFFICE.

WILLIAM N. WEMMER, OF TRENTON, NEW JERSEY.

SAFETY-VALVE.

SPECIFICATION forming part of Letters Patent No. 692,808, dated February 4, 1902.

Application filed May 16, 1901. Serial No. 60,565. (No model.)

*To all whom it may concern:*

Be it known that I, WILLIAM N. WEMMER, a citizen of the United States, and a resident of Trenton, in the county of Mercer and State of New Jersey, have made a certain new and useful Invention in Safety-Valves; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a sectional view of my device as applied to a radiator with valve thereof closed. Fig. 2 is a similar view with valve open. Fig. 3 is a fragmentary view showing position assumed by ball-valve when air-valve is broken off. Fig. 4 shows my device applied to boiler. Fig. 5 is a detail view of the end of the wire or prop $s$ as used in connection with a boiler-coupling.

The invention has relation to safety appliances for hot-water radiators, range circulating-boilers, and similar hollow hot-water-containing apparatus; and it consists in the novel construction and combinations of devices, as hereinafter set forth.

In the accompanying drawings, illustrating the invention, the letter $a$ designates the wall of a radiator or similar structure, and $b$ an opening therein for an escape or air valve, such as is usually connected to such a radiator. In the case of a boiler the opening may be for the usual connection of an outlet-tube on the side or in the bottom of the boiler.

In the opening $b$ of a radiator the air-valve is placed, being usually threaded at its end to engage the opening, also threaded. Should an air-valve become loose or broken, there is danger of flooding the apartment with hot water and also liability of scalding the persons who are by and who may attempt to stop the flow. In order to obviate this, the safety appliance $m$ is provided, comprising an elongated cage or tubular case $d$, open sufficiently at its rear end to allow the passage of air or water. It has also an opening through its inner valve-seat $v$ in front to form a passage to the tube of the air-valve. In this cage or case is placed a small ball-valve $e$, which is loose therein, but cannot escape through the rear opening $f$ of the cage, because such opening is too small. Neither can it escape through the front valve-seat opening $g$ for a similar reason. For convenience the front opening $g$ may be made in a threaded plug $k$ or a spider device, which is screwed into the mouth of the cage. Into this threaded mouth may also be screwed the threaded end of the air-valve, which in this instance is not screwed into the opening of the radiator-wall, its place being taken in such seat by the exteriorly-threaded cylindrical portion $l$ of the cage or case $d$. The manner of connecting the parts may be varied when the appliance is manufactured with the air-valve in ways which will readily occur to those skilled in the art; but the principles upon which it operates will remain the same. The diameter of the chamber of the cage or case $d$ is just sufficient to allow the ball-valve to move lengthwise therein.

In order to render the appliance operative, the wire or prop $s$ must be put in place. This is a short, loose, or unattached piece of wire of sufficient and proper length to engage the ball-valve and hold it in the rear portion of its cage or elongated case or off its seat in the front of the same when its front end is against the air-valve plug $p$ or other abutment in the pipe or tube which is liable to accident. In the case of a radiator air-valve a certain amount of play is necessary to the opening and closing of the valve, the plug moving lengthwise in such adjustments in the usual constructions; but should the air-valve be broken off or its plug be lost out of the air-valve tube it is designed that the loose or detached wire shall have free movement to escape from the cage, and the ball-valve will immediately be pressed home against the front valve-seat $v$ of the cage by the water in the radiator or other structure, and the escape of the water will be thereby entirely stopped.

When the appliance is to be used in connection with a boiler-coupling, it should be screwed into the end of the spud which goes in the boiler. The wire being then cut to proper length to hold the ball-valve back off its valve-seat is then put in place, its front end bearing against an abutment in the coupling or outlet pipe.

Having described this invention, what I claim, and desire to secure by Letters Patent, is—

The combination with a hot-water-containing apparatus and an outlet-tube connected thereto, having a valve or abutment, of an elongated cage having a rear opening, and a front inner valve-seat, a ball loosely movable in said cage, and a loose or detached piece of wire forming a prop adapted to engage by its respective ends said valve or abutment and said ball, substantially as specified.

In testimony whereof I affix my signature in presence of two witnesses.

WILLIAM N. WEMMER.

Witnesses:
WILLIAM S. MILLS,
HENRY WIRTSCHAFTER.